United States Patent [19]

Perlin

[11] Patent Number: 4,676,584
[45] Date of Patent: Jun. 30, 1987

[54] FIBER OPTIC LIGHT COUPLING ASSEMBLIES

[75] Inventor: Alfred R. Perlin, Highland Park, Ill.

[73] Assignee: Metatech Corporation, Wheeling, Ill.

[21] Appl. No.: 506,839

[22] Filed: Jun. 22, 1983

[51] Int. Cl.$^4$ .................................................. G02B 6/36
[52] U.S. Cl. .................................. 350/96.15; 350/96.10
[58] Field of Search ................ 350/96.15, 96.18, 96.19

[56] References Cited

U.S. PATENT DOCUMENTS

| | | | |
|---|---|---|---|
| 3,982,123 | 9/1976 | Goell et al. | 250/227 |
| 4,060,308 | 11/1977 | Barnoski et al. | 350/96.10 |
| 4,182,935 | 1/1980 | Chown | 350/96.15 |
| 4,270,839 | 6/1981 | Cross | 350/96.15 |
| 4,329,017 | 5/1982 | Kapany et al. | 350/96.15 |
| 4,352,565 | 10/1982 | Rowe et al. | 350/96.15 X |
| 4,365,864 | 12/1982 | Cowley et al. | 350/96.15 X |
| 4,373,814 | 2/1983 | Lacombat et al. | 350/96.15 X |
| 4,400,053 | 8/1983 | Kazkaz | 350/96.15 |
| 4,410,236 | 10/1983 | Schiffner | 350/96.15 |
| 4,412,720 | 11/1983 | Costa | 350/96.15 X |
| 4,421,979 | 12/1983 | Asawa et al. | 350/96.15 X |
| 4,423,922 | 1/1984 | Porter | 350/96.15 |
| 4,439,005 | 3/1984 | Winzer | 350/96.15 |
| 4,446,543 | 5/1984 | McLandrich et al. | 350/96.15 X |
| 4,447,117 | 5/1984 | Bobb | 350/96.15 |

FOREIGN PATENT DOCUMENTS

| | | | |
|---|---|---|---|
| 0000529 | 7/1979 | European Pat. Off. | |
| 0151455 | 11/1979 | Japan | 350/96.15 |
| 0033129 | 3/1980 | Japan | 350/96.15 |
| 0060906 | 5/1980 | Japan | 350/96.15 |
| 0103509 | 8/1980 | Japan | 350/96.15 |
| 0017305 | 2/1981 | Japan | 350/96.15 |
| 0077805 | 6/1981 | Japan | 350/96.15 |
| 0022206 | 2/1982 | Japan | 350/96.15 |
| 0066403 | 4/1982 | Japan | 350/96.15 |
| 0089702 | 6/1982 | Japan | 350/96.15 |
| 1538195 | 1/1979 | United Kingdom | |
| 1571652 | 7/1980 | United Kingdom | |
| 2115948 | 9/1983 | United Kingdom | |

*Primary Examiner*—William L. Sikes
*Assistant Examiner*—Akm E. Ullah

[57] ABSTRACT

A fiber optic light coupling assembly is disclosed including at least one local physical distortion introduced into the geometry of a fiber at a position intermediate its ends. Light is introduced into the fiber at this position and is directed essentially unidirectionally therefrom toward a desired end of the fiber for processing and retransmission of a light signal back through the fiber for exit at the other end thereof.

11 Claims, 17 Drawing Figures

FIBER OPTIC LIGHT COUPLING ASSEMBLIES

BACKGROUND OF THE INVENTION

The present invention relates generally to fiber optic light couplers and, more particularly, to fiber optic coupling assemblies for directionally inserting light into optic fibers or optical waveguides.

As is well known, an optical fiber or optical waveguide is constituted by a core with a refractive index N surrounded by a cladding with an index n lower than N and that it guides, in the core, light which is introduced at one end thereof to the other end essentially by a process of internal reflection.

In a typical arrangement, such as in a two way fiber optic light coupling assembly, light is introduced into one end of the fiber or waveguide through a light separator or beam splitting lens system and travels in a forward direction through the fiber core to the exit end of the fiber where, for example, it is reflected off a movable or deformable mirror back into the fiber or waveguide and returns in the reverse direction back to the entrance end of the fiber or waveguide where it exits the fiber and is directed by the light separator or beam splitter to a detector such as a photodiode. However, it has been found that in all such prior arrangements, a problem is presented in that the returning light signal directed toward the detector is obscured or significantly masked as a result of the optical interface reflections generated primarily at the light entrance end of the fiber and off the light separator or beam splitting lens itself.

Accordingly, it is an object of the present invention to provide a solution for this problem by providing a fiber optic coupler which directs injected light essentially unidirectionally from a position of introduction of the light into the core intermediate the ends of the fiber or waveguide toward the exit end of the fiber or waveguide so that interference with the returning light signal at the end of the fiber at which the detector is positioned will be essentially eliminated.

SUMMARY OF THE INVENTION

According to a principal aspect of the present invention, there is provided fiber optic light coupling assemblies in which at least one local physical distortion is introduced in the geometry of the fibers or waveguides at a position intermediate the ends of the fibers or waveguides. Preferably, the said geometric distortion will take the form of an axial bend, loop or coil in the fiber, a symmetrical or nonsymmetrical swelling in the surface of the fiber rotationally about the axis thereof or a symmetrical or nonsymmetrical identation, serration, notch or trough in the surface of the fiber rotationally about the axis of the fiber. In this arrangement, light rays from a single or multiple light source including incandescent lamps, lasers, fiber optic illuminators and the like are directed at the physically distorted area in the surface of the fiber and enter into the core of the fiber at this position along the length of the fiber and the light travels in a predetermined direction, preferably, essentially unidirectionally therefrom toward the desired exit end of the fiber for retransmission back through the fiber to the other end thereof at which the detector is located. Thus, in view of the position of light injection and the initial essentially unidirectional travel direction of the introduced light away from the end of the fiber at which the detector is positioned, the problems encountered heretofore regarding obscuring or masking of the returning light signal at the detection end of the fiber are essentially eliminated.

DESCRIPTION OF THE PREFERRED EMBODIMENTS

Figure 1:
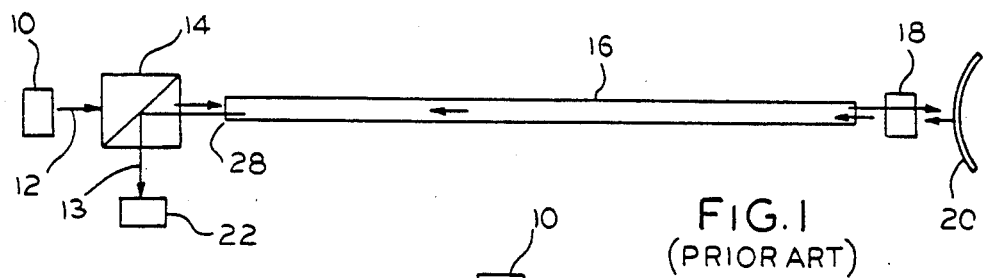
FIG. 1 illustrates a well known two way fiber optic communication assembly.

A description of the invention follows referring to the drawings in which like reference numerals denote like elements of structure in each of the several figures. In general, the terms "optical fiber" or "optical waveguide" will be used herein to refer to a glass or plastic transmission line having a core member with cladding members concentrically surrounding the core for transmission by internal reflection at the core-cladding interface of electromagnetic radiation which lies in the optical portion of the electromagnetic spectrum between microwaves and X-rays including the ultra-violet, visible and infra-red regions.

Reference is now made to FIG. 1 of the drawings which shows a well known two way fiber optic communication assembly of the prior art wherein a light source 10 such as an incandescent lamp, a laser or a fiber optic illuminator directs a beam of light 12 through a beam splitting lens system generally designated 14 which focuses the light beam 12 toward the transmitting end of a glass or plastic optical fiber or optical waveguide 16. The light 12 is then transmitted in a forward direction through the core of the fiber 16 and projects out of the fiber 16 at its exit end where it is focused through lens 18 onto a reflective surface 20 (such as a moveable or deformable mirror) which is to be measured.

One contemplative measurement that can be made of surface 20 is surface vibrations. As will be appreciated by those skilled in the art, only a small amount of the light 12 reflected off surface 20 will actually reenter the core of fiber 16 via lens 18. This reentering light 13 is then transmitted in the reverse direction to the initial transmission end of the fiber 16 where the returning light 13 which constitutes an optical information wave or light signal is directed through the beam splitter 14 to a photodetector 22 such as a photodiode for collection and measurement of its intensity and comparison with a reference light signal.

In such arrangements as previously described, it should be noted that back reflections are generated, primarily by the optical interface at the transmission end of the fiber 16 but also off the optical interface of the beam splitter 14, as the light 12 projects thereon. These back reflection effects have been found to present a serious problem in the detection of the returning light signal since they may be of an intensity such that they will obscure or significantly mask the signal.

Figure 2:
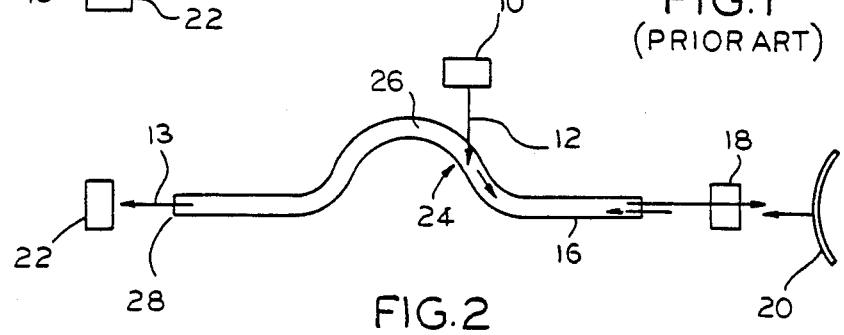
FIG. 2 is an optical diagram of one of the embodiments of the fiber optic light coupler assembly of the present invention.

Referring now to FIG. 2, and assembly in accordance with the present invention is shown, including a fiber optic light coupler, generally designated 24. In this arrangement, a light source 10 directs a beam of light 12 onto a coupling bend 26 in the surface of the fiber 16, the bend 26 being positioned intermediate the ends of the fiber 16. The light beam 12 enters the core of the fiber 16 at this bend 26 and is transmitted essentially unidirectionally toward the exit end of the fiber 16 where it is focused through lens 18 onto reflective surface 20 and is reflected back into the core of fiber 16 in the same manner as discussed with regard to the arrangement of FIG. 1. The reentering light 13 defining an optical information wave or light signal is then transmitted back through the fiber 16 in the reverse direction until it reaches the fiber end 28 at which the photodetector 22 is positioned so that the returning light signal 13 can be collected for measurement and comparison with a reference light signal at detector 22.

It should be noted that in view of the introduction of light 12 at the coupling bend 26 as illustrated in this embodiment of the invention, the hereinbefore discussed problems with regard to obscuring of the returning signal as a result of back reflections off the fiber end 28 is eliminated. Furthermore, in this assembly, the splitter 14 is not required and, thus, the inherent back reflection problems therewith are likewise eliminated.

Figure 3:
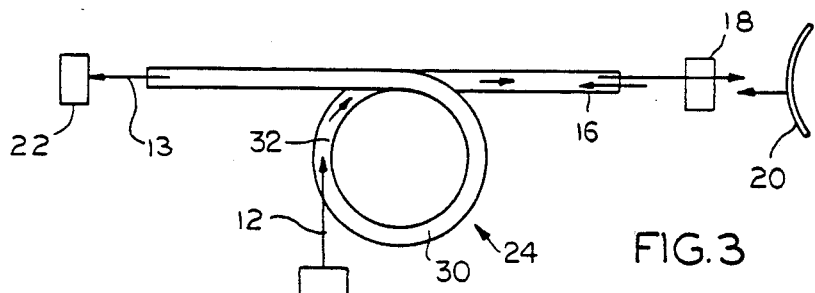
FIG. 3 is an optical diagram of an embodiment of the fiber optic coupler assembly of the present invention illustrating a single turn coupling arrangement.

While FIG. 2 shows one embodiment of the couplers of the present invention wherein a single coupling bend 26 is included as a local physical distortion in the surface of the fiber 16 intermediate the ends thereof onto which the light beam 12 is projected for introduction into the core of the fiber 16, it will be appreciated that the coupling distortions in the couplers of the present invention may take a variety of shapes and configurations. For example, as shown in FIG. 3, the coupler 24 includes as a local physical distortion in the surface of the fiber 16 a loop or single turn 30. In this embodiment, a beam of light 12 from light source 10 is projected onto a bend area 32 in loop 30 such that the light 12 entering the core of fiber 16 is biased essentially unidirectionally in a forward direction toward the exit end of the fiber 16 whereafter the light signal 13 is transmitted back to the detector 22 in the same manner as previously discussed with regard to FIG. 2.

Figure 4:
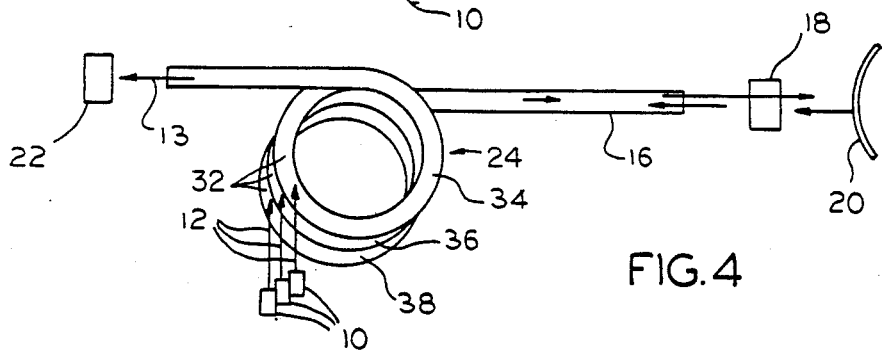
FIG. 4 is an optical diagram of an embodiment of the present invention illustrating multiple turn coupling arrangements.
Figure 5:
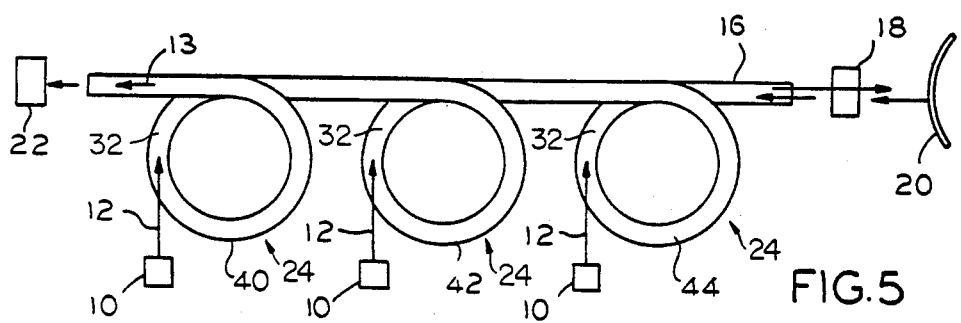
FIG. 5 is an optical diagram of an embodiment of a multiplexed coupling arrangement of the present invention.

In FIGS. 4 and 5, the couplers 24 include, as local physical distortions in the surface of the fiber 16, multiple loops or turns designated 34, 36 and 38 in FIG. 4 and 40, 42 and 44 in FIG. 5 with multiple light sources 10, projecting beams of light 12 onto respective bend areas 32 in the loops. Again, the light 12 entering the core of the fiber 16 in each of these multiplexed assemblies is biased essentially unidirectionally in a forward direction toward the exit end of the fiber 16 for subsequent retransmission of light signal 13 back to the detector 22 as previously discussed with regard to FIG. 2.

Figure 6:
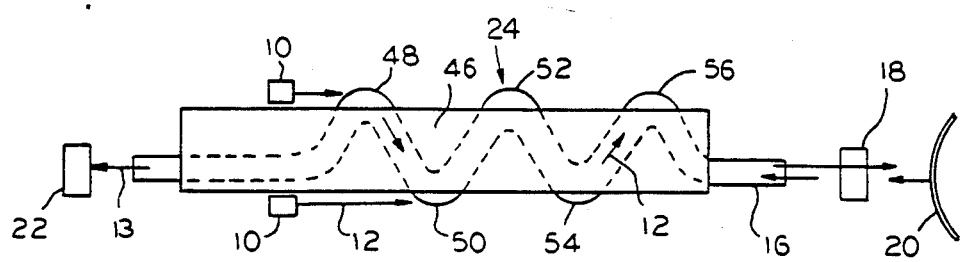
FIG. 6 is an optical diagram of an embodiment of the present invention illustrating a sinusoidally bent coupling arrangement within a light blocking housing.

Regarding FIG. 6, an embodiment of the invention is illustrated wherein the fiber 16 is linearly distorted along a portion of the length thereof in a sinusoidally curved shape and this curved section which constitutes the light coupler 24 is embedded in a light blocking matrix 46 with the radially outward portions of the curved area 48, 50, 52, 54 and 56 relative to the axis of the fiber 16 projecting out of the matrix 46. In this assembly, multiple light sources 10 direct beams of light 12 onto the projecting curved areas 48, 50, 52, 54 and 56 so that the light 12 enters the core of the fiber 16 at these positions and is directed essentially uniformly in a forward direction toward the exit end of the fiber for further processing as discussed hereinbefore with regard to FIG. 2. As will be noted, the light blocking matrix 46 utilized in this embodiment of the invention provides a barrier to prevent extraneous light from projecting onto the surface of the fiber 16 at undesired positions of distortion of the fiber 16 and if desired, may be used with any of the other embodiments herein depicted.

Figure 7:
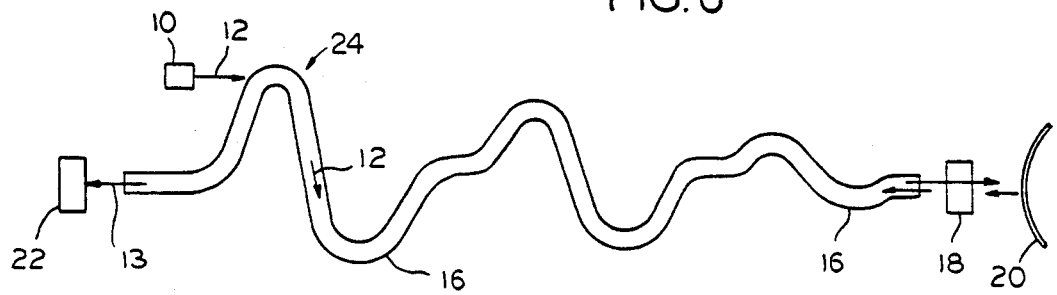
FIG. 7 is an optical diagram of an embodiment of the present invention illustrating a multiple turn coupler.
Figure 8:
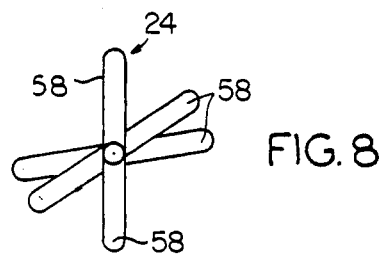
FIG. 8 is a perspective end view of the coupler shown in FIG. 7.

In FIG. 7, the fiber 16 is shaped into coils 58 along its length presenting a progressively winding lengthwise distortion of the fiber 16 which in end view, as best shown in FIG. 8, presents a roseate-like pattern onto which beams of light 12 are directed from light source 10. The light 12 passes into the core of the fiber 16 at these coiled areas 58 which constitute the coupler 24 and is transmitted essentially unidirectionally therefrom toward the exit end of the fiber 16, for further processing as discussed in regard to FIG. 2.

FIGS. 9–17 show further embodiments of the present inventive couplers 24 each of which being constructed to enable light 12 to enter the core of the fiber 16 at a position intermediate the ends of the fiber 16 with the direction of light transmission being biased in a forward direction toward the exit end of the fiber 16. Again, the light 12 reaching the exit end of the fiber is processed for retransmission of light signal 13 back to the detector 22, as illustrated in each figure and in accordance with the steps discussed above with regard to the embodiment disclosed in FIG. 2.

Figure 9:
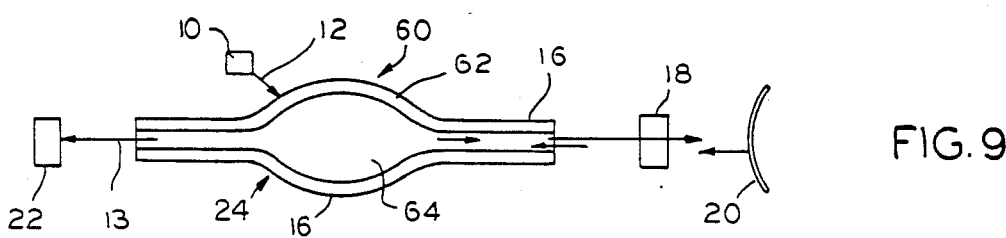
FIG. 9 is an optical diagram of an embodiment of the present invention illustrating a coupler having a symmetrical swelling of the fiber or waveguide cladding and core rotationally about the axis of the fiber or waveguide.
Figure 10:
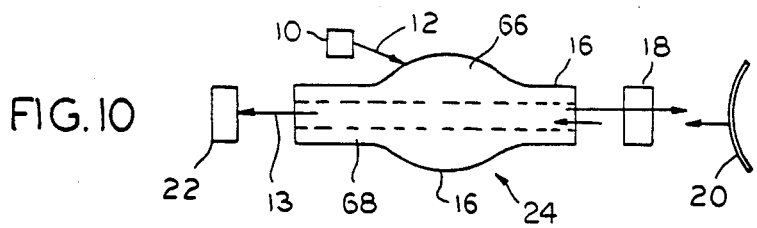
FIG. 10 is an optical diagram of an embodiment of the present invention illustrating a coupler having a symmetrical swelling of the fiber or waveguide cladding rotationally about the axis of the fiber or waveguide.
Figure 11:
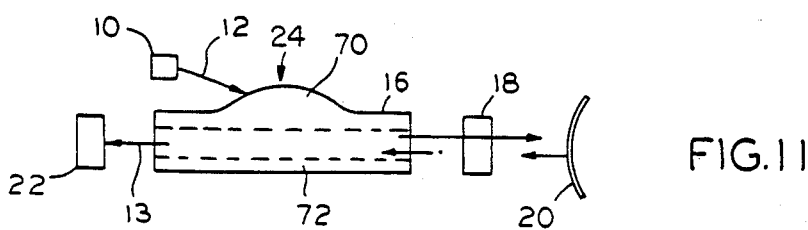
FIG. 11 is an optical diagram of an embodiment of the present invention illustrating a coupler having a nonsymmetrical swelling of the fiber or waveguide cladding rotationally about the axis of the fiber or waveguide.

With reference to FIG. 9, the coupler 24 includes, as a local distortion in the surface of the fiber, a symmetrical swelling or node generally designated 60 in both the cladding 62 and core 64 of fiber 16 rotationally about the axis of the fiber 16 so that the beam of light emanating from light source 10 projects onto the surface of the swelling 60 and enters the core 64 of the fiber 16 for transmission essentially unidirectionally toward the exit end thereof. Similarly, the couplers 24 shown in FIGS. 10 and 11, include swellings or nodes 66 and 70, respectively, as local physical distortions in the geometry of the fiber 16 onto which the beam of light 12 is directed from light source 10. The embodiment of FIG. 10 differing from the embodiment shown in FIG. 9 in that the symmetrical swelling 66 is only of the cladding 62 of fiber 16 and the embodiment in FIG. 11 differing in that the swelling 70 of the cladding 62 of fiber 16 is nonsymmetrical with regard to the rotational axis of the fiber 16. With regard to swellings or nodes 66 and 70, it should be noted that within the scope of the present invention it is contemplated that these distortions may be formed not only from the cladding material itself but can also be formed by application of additional material onto the surface of the cladding to build up the bulge.

Figure 12:
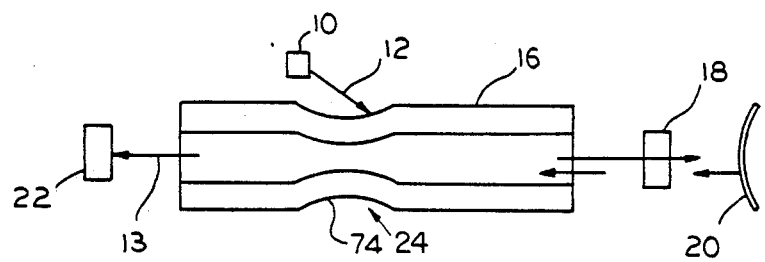
FIG. 12 is an optical diagram of an embodiment of the present invention illustrating a coupler having a symmetrical trough in the cladding and core of the fiber or waveguide about the rotational axis thereof.
Figure 13:
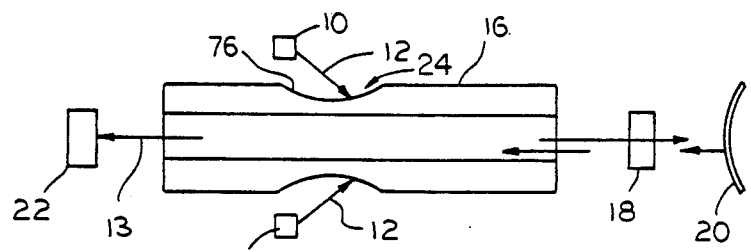
FIG. 13 is an optical diagram of an embodiment of the present invention illustrating a coupler having a symmetrical trough in the cladding of the fiber or waveguide about the rotational axis thereof.
Figure 14:
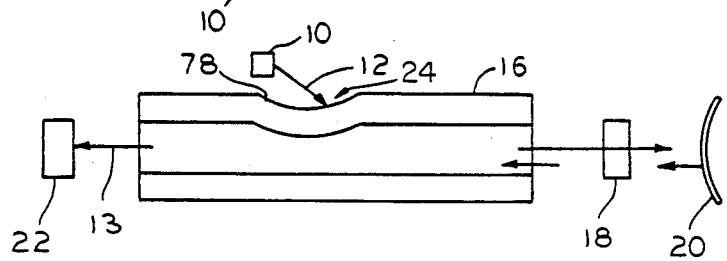
FIG. 14 is an optical diagram of an embodiment of the present invention illustrating a coupler having a nonsymmetrical trough in the cladding and core of the fiber or waveguide about the rotational axis thereof.
Figure 15:
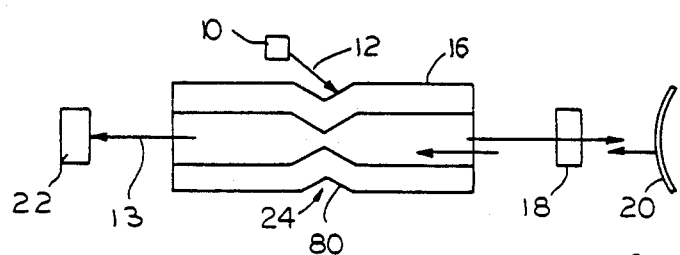
FIG. 15 is an optical diagram of an embodiment of the present invention illustrating a coupler having a symmetrical notch in the cladding and core of the fiber or waveguide about the rotational axis thereof.
Figure 16:
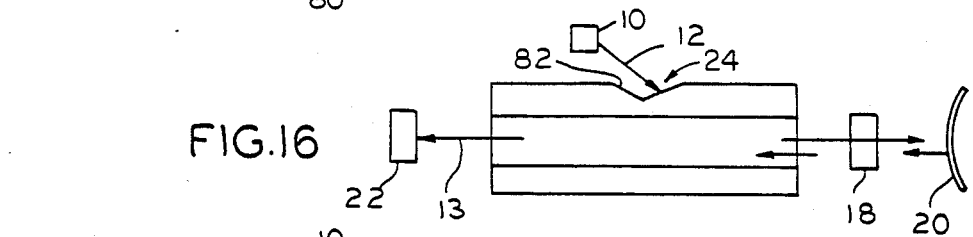
FIG. 16 is an optical diagram of an embodiment of the present invention illustrating a coupler having a nonsymmetrical notch in the cladding of the fiber or waveguide about the rotational axis thereof.
Figure 17:
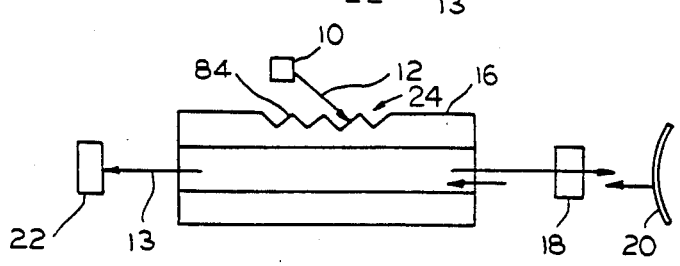
FIG. 17 is an optical diagram of an embodiment of the present invention illustrating a nonsymmetrical serration of the cladding of the fiber or waveguide about the rotational axis thereof.

FIGS. 12–17 are further illustrations of embodiments of the present inventive couplers 24 wherein troughs or indentations designated 74, 76 and 78, respectively, in FIGS. 12, 13 and 14, notches 80 and 82, respectively, in FIGS. 15 and 16; and serrations 84 in FIG. 17 are included as physical distortions in the geometry of the fiber 16 onto which the beam of light 12 is directed from light source 10.

As discussed above with regard to each of the embodiments of the present invention, illustrated herein, light beams are directed at physically distorted areas in the surfaces of the fibers intermediate the ends thereof in order to introduce light into the core of the fiber for transmission therethrough essentially unidirectionally toward a desired end of the fiber. In this regard, it has been found that the angle of incidence of the light beam onto the physically distorted area is of significance in achieving the desired directional transmission of the light. Specifically, it has been found that any angle of incidence of light onto the distorted areas of the fiber less than the polarizing angle, also known as Brewster's angle, is satisfactory depending on the specific application intended for the couplers. However, in a most preferred embodiment of this invention, the angle of incidence should approach Brewster's angle but should not exceed it since no coupling will result at higher angles. Furthermore, as the angle of incidence of light on the distorted surface approaches 0° (i.e., radial to the surface) the assembly becomes a splitter arrangement with light transmitted about equally in both directions from the position of introduction of light into the core of the fiber as opposed to a unidirectional coupling assembly.

Additionally, it has been found that the larger the surface area of the distortion which is illuminated, the greater is the amount of light that will enter the fiber. Also, it has been found that the smaller the radius of bend of the distortion in the surface of the fiber, the more light that will enter into the fiber.

The present invention has proved to be effective in providing essentially unidirectional insertion of light into an optical fiber or optical waveguide and, in tests which have been conducted, the light transmitted in a forward direction toward the exit end of a fiber from a coupler of the present invention has been measured to be 16 times greater than the light introduced at the coupler in the reverse direction.

This invention has been described with reference to preferred embodiments. Obvious modifications and alterations will occur to others upon reading and understanding the specification. The intent is to include all such modifications and alterations insofar as they come within the scope of the appended claims or equivalents thereof.

What is claimed is:

1. A fiber optic light coupling assembly comprising a light source, an optical fiber having a fiber body of finite length with a first and a second end and at least one physical distortion shaped in the form of a symmetrical or nonsymmetrical swelling in the surface of the fiber integrally formed in the body of the fiber at a position intermediate the first and second ends of said fiber for introducing light from said light source into said fiber by directing a light beam from said light source at said at least one physical distortion whereby said light beam enters into said fiber at said position intermediate said first and second ends of said fiber and is transmitted essentially unidirectionally from said intermediate position to one of said ends of said fiber.

2. The assembly of claim 1 wherein said light transmitted to said second end of said fiber is projected onto a reflective surface with at least a portion of the projected light being reflected back into said fiber at said second end for retransmission in a reverse direction and detection at said first end of said fiber.

3. The assembly of claim 1 wherein said light source is positioned so that the beam of light therefrom is directed at said physical distortion at an angle of incidence not exceeding Brewster's angle.

4. The assembly of claim 3 wherein said angle of incidence approximates Brewster's angle.

5. A coupler for introducing light into an optical fiber such that the introduced light is transmitted through said fiber in a predetermined direction, said fiber being of finite length with a first and a second end, said coupler comprising at least one physical distortion in the geometry of said fiber positioned intermediate said first and second ends of said fiber and shaped in the form of a symmetrical or nonsymmetrical swelling in the surface of the fiber so as to allow light directed at said physical distortion to enter said fiber at said position intermediate said ends of said fiber and to be transmitted essentially unidirectionally from said position to one of said ends of said fiber.

6. The coupler of claim 5 wherein said at least one physical distortion of the fiber is partially embedded in a light blocking matrix with a portion projecting out of said matrix for introduction of said light into said fiber.

7. A two way optical light coupling assembly comprising an optical fiber of finite length having first and second ends, said fiber including at least one physically distorted region shaped in the form of a symmetrical or nonsymmetrical swelling in the surface of the fiber positioned intermediate said first and second ends, a light source direction a light beam at said physically distorted region at an angle of incidence such that said light beam enters said fiber at said region for transmission through said fiber essentially unidirectionally from said region to said second end of said fiber, said transmitted light beam projecting from said second end of said fiber onto a reflective surface with at least a portion of the projecting light beam being reflected back into said fiber at said second end for retransmission in a reverse direction and detection at said first end of said fiber.

8. The coupling assembly of claim 7 wherein said angle of incidence of light at said physically distorted region does not exceed Brewster's angle.

9. The coupling assembly of claim 7 wherein said angle of incidence of light at said physically distorted region approximates Brewster's angle.

10. The coupling assembly of claim 7 wherein said physically distorted region is partially embedded in a light blocking matrix with a portion of the physically distorted surface of the fiber projecting out of said matrix.

11. A two way fiber optic light coupling assembly comprising an optical fiber of finite length having first and second ends, said fiber including at least one physically distorted region shaped in the form of a symmetrical or nonsymmetrical swelling in the surface of the fiber positioned intermediate said first and second ends and a light source directing a light beam at said physically distorted region at an angle of incidence such that said light beam enters said fiber at said region for transmission through said fiber in a predetermined direction from said region.

* * * * *